(12) United States Patent
Shen (10) Patent No.: US 11,234,315 B2
(45) Date of Patent: Jan. 25, 2022

(54) COMBINED LAMP STRIP CONTROLLER AND COMBINED LAMP STRIP CONTROL METHOD

(71) Applicant: NING BO GOLDEN POWER ELECTRONIC CO., LTD, Cixi (CN)

(72) Inventor: Zhengxian Shen, Linxiang (CN)

(73) Assignee: NING BO GOLDEN POWER ELECTRONIC CO., LTD, Cixi (CN)

( * ) Notice: Subject to any disclaimer, the term of this patent is extended or adjusted under 35 U.S.C. 154(b) by 67 days.

(21) Appl. No.: 16/833,675

(22) Filed: Mar. 30, 2020

(65) Prior Publication Data

US 2021/0153327 A1  May 20, 2021

(30) Foreign Application Priority Data

Nov. 20, 2019  (CN) .......................... 201911142469.8
Nov. 20, 2019  (CN) .......................... 201911142475.3

(51) Int. Cl.
*H05B 47/13* (2020.01)
*F21S 4/28* (2016.01)
*H05B 47/12* (2020.01)
*H05B 45/10* (2020.01)

(52) U.S. Cl.
CPC ............... *H05B 47/13* (2020.01); *F21S 4/28* (2016.01); *H05B 45/10* (2020.01); *H05B 47/12* (2020.01)

(58) Field of Classification Search
CPC ........ H05B 47/13; H05B 47/12; H05B 45/10; H05B 45/39; H05B 45/40; H05B 45/42; F21S 4/28; Y02B 20/30; Y02B 20/40
See application file for complete search history.

(56) References Cited

U.S. PATENT DOCUMENTS

| 2010/0127638 | A1  | 5/2010  | Lan et al. |
| 2015/0303817 | A1* | 10/2015 | Rutgers ............. H02M 3/33569 363/21.04 |
| 2016/0227633 | A1* | 8/2016  | Sun .................... H05B 47/12 |
| 2016/0249437 | A1  | 8/2016  | Sun et al. |
| 2017/0117891 | A1* | 4/2017  | Lohbihler ............ H05B 47/10 |
| 2019/0215923 | A1  | 7/2019  | Shen |

FOREIGN PATENT DOCUMENTS

CN          110035573 A     7/2019

* cited by examiner

*Primary Examiner* — Renan Luque (74) *Attorney, Agent, or Firm* — Bayramoglu Law Offices LLC (57) ABSTRACT

A combined lamp strip controller and a combined lamp strip control method related to the technical field of circuit control. The lamp strip controller comprises: a power supply circuit, a control circuit, an infrared transmitting circuit, an infrared receiving circuit and a drive circuit, wherein the drive circuit is a bridge drive circuit, and the infrared transmitting circuit, the infrared receiving circuit and the drive circuit are connected to the control circuit in an integrated manner. In the embodiments of the present invention, an infrared sensing assembly is used to sense changes in the environment around a lamp strip, and finally the lamp strip is driven by an infrared sensing control signal to switch a lighting mode, and one or more program instructions are further used to implement at least one sensing control mode.

6 Claims, 5 Drawing Sheets

COMBINED LAMP STRIP CONTROLLER AND COMBINED LAMP STRIP CONTROL METHOD

CROSS REFERENCES TO THE RELATED APPLICATIONS

This application is based upon and claims priority to Chinese Patent Application No. 201911142475.3, filed on Nov. 20, 2019, and Chinese Patent Application No. 201911142469.8, filed on Nov. 20, 2019, the entire contents of which are incorporated herein by reference.

TECHNICAL FIELD

Embodiments of the present invention relate to the technical field of circuit control, and in particular, to a combined lamp strip controller and a combined lamp strip control method.

BACKGROUND

With the development of LED light source-based illumination devices, many lamp strips have appeared on the market, which are used in jewelry cabinets, cosmetics cabinets, boutique cabinets, wine cabinets, glassware cabinets, cultural relic display cabinets, medicine cabinets, bar counters, supermarket refrigerated display cabinets and other occasions for decorating the environment at night. Common lamp strips include Great Wall lamp bars, LED lamp bars, LED soft light bars, light bars, FPC lamp bars, etc.

The lamp strips are controlled mostly using LED lamp strip controllers. However, the lamp strip controllers on the market cannot control the lighting mode of the lamp strips by sensing changes in the environment around the lamp strips, and do not have flexibility.

SUMMARY

To this end, the embodiments of the present invention provide a combined lamp strip controller and a combined lamp strip control method to solve the problem in the prior art of the single control approach of the lamp strip controller being unable to control the lighting mode of the lamp strip by sensing changes in the environment around the lamp strip.

In order to achieve the above object, the embodiments of the present invention provide the following technical solutions.

According to a first aspect of the embodiments of the present invention, a combined lamp strip controller is provided.

The lamp strip controller comprises: a power supply circuit, a control circuit, an infrared transmitting circuit, an infrared receiving circuit and a drive circuit, wherein the drive circuit is a bridge drive circuit; the power supply circuit is configured to provide working power for each circuit in the lamp strip controller, and the infrared transmitting circuit, the infrared receiving circuit and the drive circuit are connected to the control circuit in an integrated manner; the infrared transmitting circuit is configured to continuously transmit an infrared signal to a lamp strip so as to form an infrared sensing area near the lamp strip; the infrared receiving circuit is configured to receive the infrared signal reflected by an outside person or object in the infrared sensing area and generate an infrared sensing signal; the control circuit is configured to receive the infrared sensing signal, and generate an infrared sensing control signal after being triggered by the infrared sensing signal; and the drive circuit is configured to drive the lamp strip to switch a lighting mode according to the infrared sensing control signal.

Further, the lamp strip controller further comprises an audio receiving and amplifying circuit connected to the control circuit in an integrated manner, wherein the audio receiving and amplifying circuit is configured to form an audio sensing area near the lamp strip, receive an audio signal in the audio sensing area, and amplify the received audio signal to form an audio sensing signal; the control circuit is configured to receive the audio sensing signal, and generate an audio sensing control signal after being triggered by the audio sensing signal; and the drive circuit is configured to drive the lamp strip to switch the lighting mode according to the audio sensing control signal.

Further, the lamp strip controller further comprises a point control circuit connected to the control circuit in an integrated manner, wherein the point control circuit is configured to receive a point control operation signal and convert the point control operation signal into a point control sensing signal; the control circuit is configured to receive the point control sensing signal, and generate a point control sensing control signal after being triggered by the point control sensing signal; and the drive circuit is configured to drive the lamp strip to switch the lighting mode according to the point control sensing control signal.

Further, the control circuit is provided with a single-chip microcomputer containing one or more program instructions, the one or more program instructions are configured to execute and generate at least one mode of sensing control signals, and a sensing control signal of the next mode is generated according to a setting within a predetermined period when the control circuit receives the next sensing signal; the sensing signal includes the infrared sensing signal, the audio sensing signal, and the point control sensing signal; and the sensing control signal includes the infrared sensing control signal, the audio sensing control signal, and the point control sensing control signal.

Further, the audio receiving and amplifying circuit senses an intensity of the audio signal to generate the audio sensing signal of a different intensity; the control circuit generates the audio sensing control signal of a different intensity according to the intensity of the audio sensing signal; and the drive circuit controls the lighting frequency of the lamp strip according to the intensity of the audio sensing control signal.

According to a second aspect of the embodiments of the present invention, a combined lamp strip control method is provided. The control method comprises: providing, by a power supply circuit, working power for each circuit in a lamp strip controller; connecting, by a control circuit, an infrared transmitting circuit, an infrared receiving circuit and a drive circuit in an integrated manner; continuously transmitting, by the infrared transmitting circuit, an infrared signal to a lamp strip so as to form an infrared sensing area near the lamp strip; receiving, by the infrared receiving circuit, the infrared signal reflected by an outside person or object in the infrared sensing area; generating an infrared sensing signal after the reflected infrared signal is received by the infrared receiving circuit; generating, by the control circuit, an infrared sensing control signal after being triggered by the infrared sensing signal; and driving, by the drive circuit, the lamp strip to switch a lighting mode according to the infrared sensing control signal, the drive circuit being a bridge drive circuit.

Further, the control method further comprises: forming, by an audio receiving and amplifying circuit connected to the control circuit in an integrated manner, an audio sensing area near the lamp strip, receiving an audio signal in the audio sensing area, and amplifying the received audio signal to form an audio sensing signal; generating, by the control circuit, an audio sensing control signal after being triggered by the audio sensing signal; and driving, by the drive circuit, the lamp strip to switch the lighting mode according to the audio sensing control signal.

Further, the control method further comprises: receiving, by a point control circuit connected to the control circuit in an integrated manner, a point control operation signal and converting the point control operation signal into a point control sensing signal; generating, by the control circuit, a point control sensing control signal after being triggered by the point control sensing signal; and driving, by the drive circuit, the lamp strip to switch the lighting mode according to the point control sensing control signal.

Further, the control circuit executes and generates at least one mode of sensing control signals by means of one or more program instructions contained in a single-chip microcomputer, and a sensing control signal of the next mode is generated according to a setting within a predetermined period when the control circuit receives the next sensing signal; the sensing signal includes the infrared sensing signal, the audio sensing signal, and the point control sensing signal; and the sensing control signal includes the infrared sensing control signal, the audio sensing control signal, and the point control sensing control signal.

Further, the control method further comprises: sensing, by the audio receiving and amplifying circuit, an intensity of the audio signal to generate the audio sensing signal of a different intensity; generating, by the control circuit, the audio sensing control signal of a different intensity according to the intensity of the audio sensing signal; and controlling, by the drive circuit, the lighting frequency of the lamp strip according to the intensity of the audio sensing control signal.

The embodiments of the present invention have the following advantages:

in the embodiments of the present invention, an infrared sensing assembly is used to sense changes in the environment around a lamp strip, and finally the lamp strip is driven by an infrared sensing control signal to switch a lighting mode, and one or more program instructions are further used to implement at least one sensing control mode; and a sensing control signal of the next mode is generated according to a setting within a predetermined period when the control circuit receives the next sensing signal. In addition, the combined lamp strip control can also support audio sensing control approach and point control sensing control approach at the same time, which can greatly increase the control approaches of the lamp strip and make the control more flexible. In the audio sensing control approach, the intensity of the audio signal can also be sensed, and the intensity of the audio signal is used to control the lighting frequency of the lamp strip.

BRIEF DESCRIPTION OF THE DRAWINGS

To describe the technical solutions in the implementations of the present invention or in the prior art more clearly, the following briefly introduces the accompanying drawings required for describing the implementations or the prior art. It is obvious that the drawings in the following description are merely exemplary, and for those of ordinary skill in the art, other implementation drawings would have been derived from the extension according to the provided drawings without involving any inventive effort.

The structures, proportions, sizes and the like depicted in this specification are only used to fit with the content disclosed in the specification for understanding and reading by those skilled in the art, but are not intended to limit the limitation conditions that can be implemented in the present invention, and thus have no technically substantive meaning. Any of the modification of structure, the change of proportional relationship or the adjustment of size should fall within the scope covered by the technical content disclosed in the present invention without affecting the effects produced and the object achievable by the present invention.

DETAILED DESCRIPTION OF THE EMBODIMENTS

The embodiments of the present invention are illustrated below by using the specific embodiments, and those skilled in the art would have readily understood other advantages and effects of the present invention from the disclosure of this description, and it is obvious that the described embodiments are some of the embodiments of the present invention rather than all the embodiments. Based on the embodiments of the present invention, all other embodiments obtained by those of ordinary skill in the art without involving any inventive effort fall within the scope of protection of the present invention.

Embodiment 1

Figure 1:
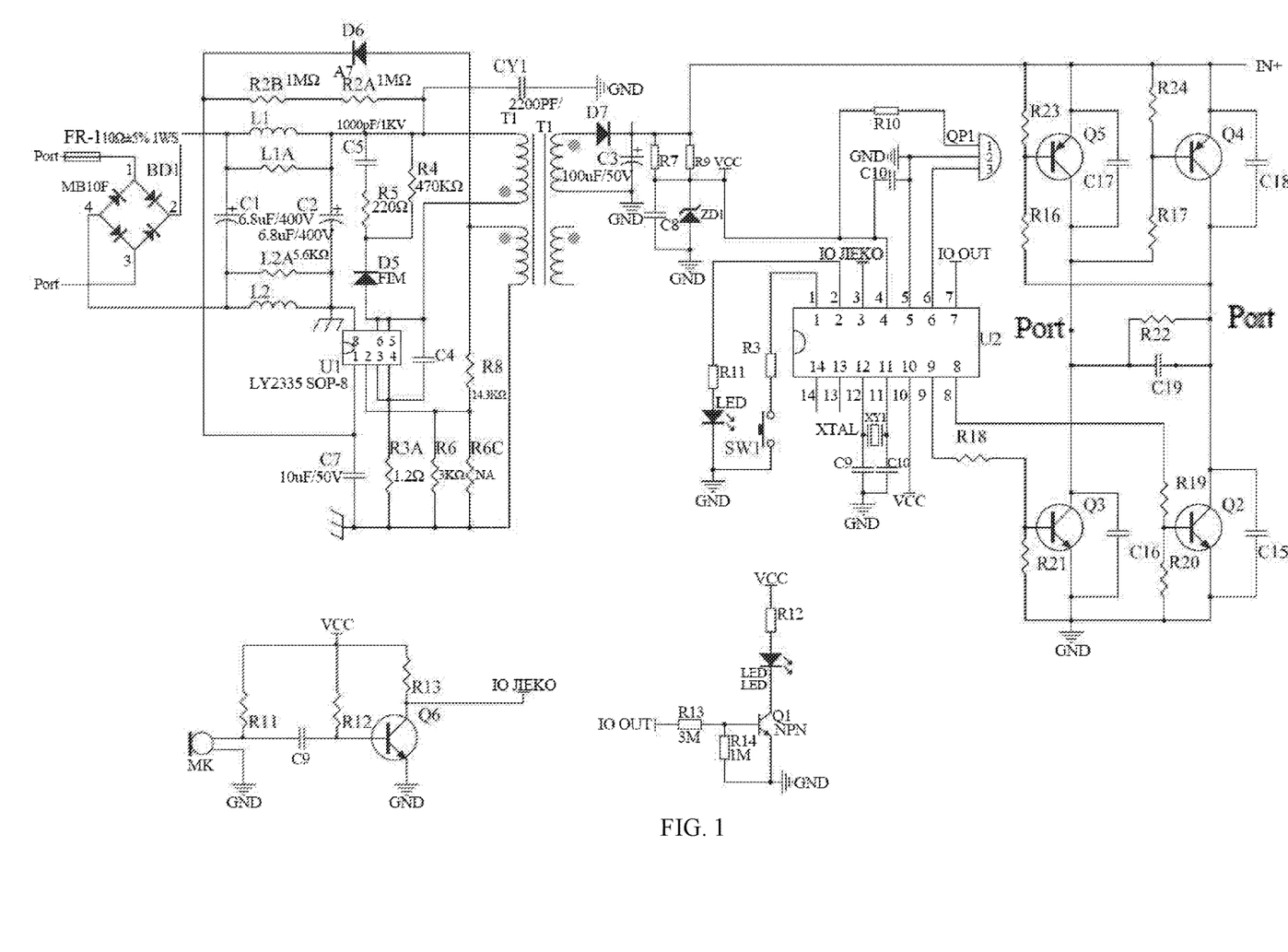
FIG. 1 is a schematic diagram of an overall circuit of a combined lamp strip controller according to an embodiment of the present invention.
Figure 2:
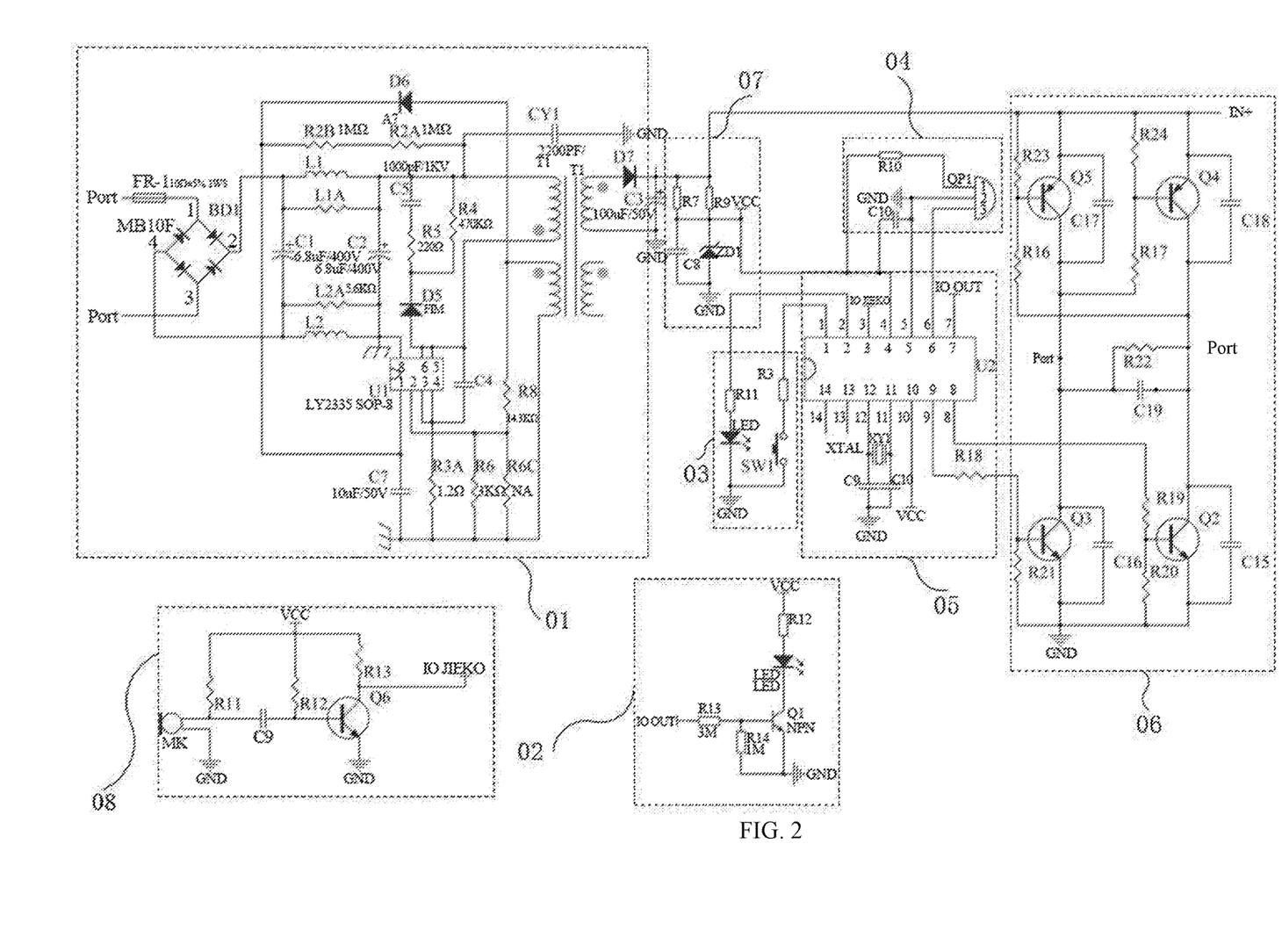
FIG. 2 is a schematic diagram of each circuit partition of a combined lamp strip controller according to an embodiment of the present invention.

An embodiment of the present invention provides an infrared-sensing lamp strip controller. Referring to FIGS. 1 and 2, the lamp strip controller mainly comprises a power supply circuit 01, an infrared transmitting circuit 02, an infrared receiving circuit 04, a control circuit 05, and a drive circuit 06. The power supply circuit 01 is configured to provide working power for each circuit in the lamp strip controller, and the infrared transmitting circuit 02, the infrared receiving circuit 04 and the drive circuit 06 are connected to the control circuit 05 in an integrated manner. The infrared transmitting circuit 02 is configured to continuously transmit an infrared signal to a lamp strip so as to form an infrared sensing area near the lamp strip. The infrared receiving circuit 04 is configured to receive the infrared signal reflected by an outside person or object in the infrared sensing area and generate an infrared sensing signal. The control circuit 05 is configured to receive the infrared sensing signal, and generate an infrared sensing control signal after being triggered by the infrared sensing signal. The drive circuit 06 is configured to drive the lamp strip to switch a lighting mode according to the infrared sensing control signal.

Corresponding to the above-mentioned infrared-sensing lamp strip controller, an embodiment of the present invention further discloses a combined lamp strip control method. The control method comprises: providing, by a power supply circuit 01, working power for each circuit in a lamp strip controller; connecting, by a control circuit 05, an infrared transmitting circuit 02, an infrared receiving circuit 04 and a drive circuit 06 in an integrated manner; continuously transmitting, by the infrared transmitting circuit 02, an infrared signal to a lamp strip so as to form an infrared sensing area near the lamp strip; receiving, by the infrared receiving circuit 04, the infrared signal reflected by an outside person or object in the infrared sensing area; generating an infrared sensing signal after the reflected infrared signal is received by the infrared receiving circuit 04; generating, by the control circuit 05, an infrared sensing control signal after being triggered by the infrared sensing signal; and driving, by the drive circuit 06, the lamp strip to switch a lighting mode according to the infrared sensing control signal, the drive circuit being a bridge drive circuit.

In the embodiment of the present invention, the infrared transmitting circuit is used to form an infrared sensing area near the lamp strip, and the infrared receiving circuit is used to sense changes in the environment around the lamp strip. When passing by the lamp strip, an outside person or object enters the infrared sensing area and reflects the emitted infrared signal to the infrared receiving circuit. Finally, the lamp strip is driven by the infrared sensing control signal to switch the lighting mode, so that the lighting of the lamp strip can be controlled by way of infrared sensing, increasing the fun of the lamp strip.

Preferably, referring to FIGS. 1 and 2, a combined lamp strip controller provided by an embodiment of the present invention further comprises an audio receiving and amplifying circuit 08 connected to the control circuit 05 in an integrated manner. The audio receiving and amplifying circuit 08 is configured to form an audio sensing area near the lamp strip, receive an audio signal in the audio sensing area, and amplify the received audio signal to form an audio sensing signal. In this case, the control circuit 05 is further configured to receive the audio sensing signal, and generate an audio sensing control signal after being triggered by the audio sensing signal. The drive circuit 06 is further configured to drive the lamp strip to switch the lighting mode according to the audio sensing control signal.

Corresponding to the above-mentioned infrared-sensing lamp strip controller, an embodiment of the present invention further discloses a combined lamp strip control method. The control method further comprises: forming, by an audio receiving and amplifying circuit 08 connected to the control circuit 05 in an integrated manner, an audio sensing area near the lamp strip, receiving an audio signal in the audio sensing area, and amplifying the received audio signal to form an audio sensing signal; generating, by the control circuit 05, an audio sensing control signal after being triggered by the audio sensing signal; and driving, by the drive circuit, the lamp strip to switch the lighting mode according to the audio sensing control signal.

In the embodiment of the present invention, based on the infrared sensing control, the audio sensing control approach can also be supported at the same time, which can greatly increase the control approaches of the lamp strip and make the control on the switching of the lighting mode more flexible. Specifically, the audio receiving and amplifying circuit is used to form an audio sensing area near the lamp strip, and the audio receiving and amplifying circuit can sense changes in the environment around the lamp strip. When passing by the lamp strip, an outside person or object enters the audio sensing area and makes a sound in the audio sensing area. The audio receiving and amplifying circuit receives the audio signal and amplifies same to form an audio sensing signal. Finally, the lamp strip is driven by the audio sensing control signal to switch the lighting mode, so that the lighting of the lamp strip can be controlled by way of infrared sensing, further increasing the fun of the lamp strip.

Preferably, referring to FIGS. 1 and 2, a combined lamp strip controller provided by an embodiment of the present invention further comprises a point control circuit 03 connected to the control circuit 05 in an integrated manner. The point control circuit 03 is configured to receive a point control operation signal and convert the point control operation signal into a point control sensing signal. In this case, the control circuit 05 is further configured to receive the point control sensing signal, and generate a point control sensing control signal after being triggered by the point control sensing signal. The drive circuit 06 is further configured to drive the lamp strip to switch the lighting mode according to the point control sensing control signal.

Corresponding to the above-mentioned infrared-sensing lamp strip controller, an embodiment of the present invention further discloses a combined lamp strip control method. The control method further comprises: receiving, by a point control circuit 03 connected to the control circuit 05 in an integrated manner, a point control operation signal and converting the point control operation signal into a point control sensing signal; generating, by the control circuit 05, a point control sensing control signal after being triggered by the point control sensing signal; and driving, by the drive circuit 06, the lamp strip to switch the lighting mode according to the point control sensing control signal.

In the embodiment of the present invention, based on the infrared sensing control and audio sensing control, the point control sensing control approach can also be supported at the same time, which can greatly increase the control approaches of the lamp strip and make the control on the switching of the lighting mode more flexible. Specifically, the point control circuit is provided with a point control switch, which can manually implement a point control operation. The point control circuit can be used to receive the point control operation signal and convert same into the point control sensing signal. Finally, the lamp strip is driven by the point control sensing control signal to switch the lighting mode, so that the lighting of the lamp strip can be controlled by way of infrared sensing, further increasing the fun of the lamp strip.

Figure 3:
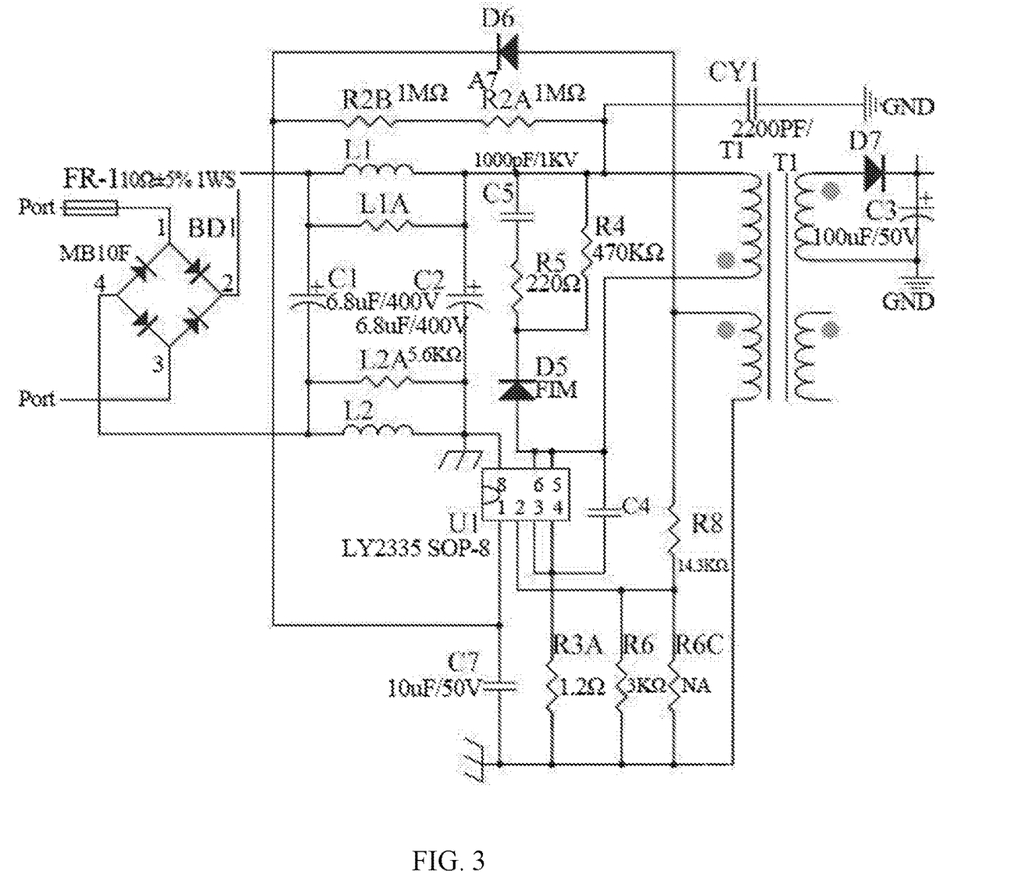
FIG. 3 is a schematic diagram of a power supply circuit of a combined lamp strip controller according to an embodiment of the present invention.

Specifically, referring to FIG. 3, the power supply circuit 01 is an AC-to-DC conversion circuit capable of converting high-voltage AC power into low-voltage DC power. The circuit components mainly comprise a fuse FR-1, a rectifier bridge BD1, a power chip U1, resistors R2A, R2B, R3A, R4, R5, R6, R6C, R8, inductors L1, L2, L1A, L2A, capacitors C1, C2, C3, C4, C5, C7, CY1, diodes D5, D6, D7, a transistor, and a transformer T1, wherein the rectifier bridge BD1 is composed of four diodes, and converts the high-voltage AC power accessing the power supply circuit 01 into high-voltage DC power; after the inductors L1 and L1A are connected in parallel, two ends thereof are respectively connected to the capacitors C1, C2, which are then connected to two ends of the inductors L2A connected in parallel, such that a high-voltage DC power filter circuit is formed to filter the high-voltage DC power. The capacitor CY1 is grounded. The capacitor C5, the resistor R5 and the diode D5 are connected in series to the power chip U1. The resistor R4 is connected in parallel to two ends of the series circuit part of the capacitor C5 and the resistor R5. The resistors R2A, R2B are the starting resistors of the power chip U1. The diode D6, the resistors R8, R3A, R6, R6C and the capacitor C7 form a RCD circuit of the power chip U1. The loss of the power chip U1 in the power supply circuit 01 is reduced to a certain extent. The power chip uses an LY2335 SOP-8 chip. The diode D7 is connected to the secondary side of the transformer. For the specific connection, see the power supply circuit 01 in FIG. 2. This circuit can first convert the high-voltage AC to the high-voltage DC through the rectifier bridge BD1. The high-voltage DC is filtered by the high-voltage DC power filter circuit, is then converted into stable low-voltage DC power through the transformer T1 and the diode D7, and finally provides working power for each circuit in the lamp strip controller through the capacitor C3, wherein an output end of the power supply circuit 01 directly provides a working voltage of 3-36 V to the lamp strip through the drive circuit 06. In addition, the output end of the power supply circuit 01 is further provided with a voltage stabilizing circuit 07. The voltage stabilizing circuit 07 comprises resistors R7, R9, a capacitor C8, and a Zener diode ZD1. The output end of the power supply circuit 01 provides a working voltage of 3.5-5.1 V to the infrared transmitting circuit 02, the infrared receiving circuit 04, the single-chip microcomputer of the control circuit 05, and the audio receiving and amplifying circuit 08 through the voltage stabilizing circuit 07. See FIG. 2 for the specific circuit connection.

Figure 4:
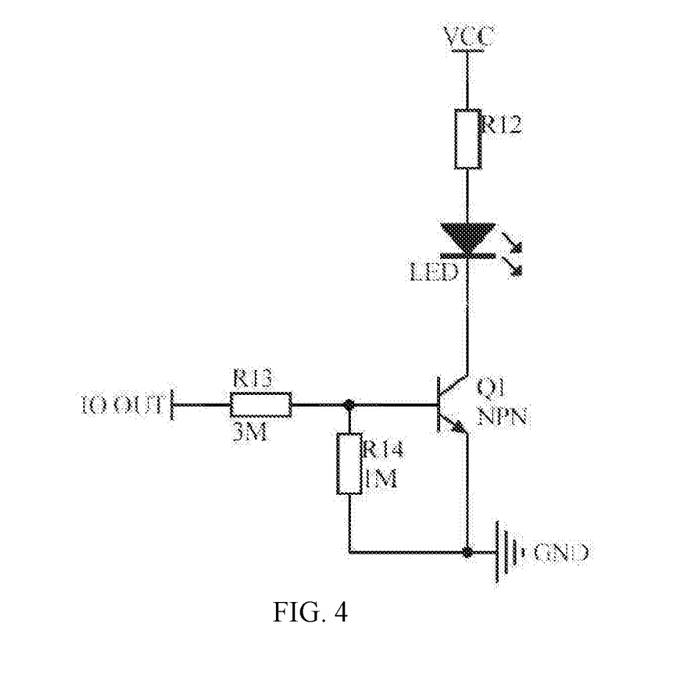
FIG. 4 is a schematic diagram of an infrared transmitting circuit of a combined lamp strip controller according to an embodiment of the present invention.

Referring to FIG. 4, the infrared transmitting circuit 02 comprises resistors R12, R13, R14, a transistor Q1 and a light source LED, wherein the resistor R13 is connected to the base of the transistor Q1, the emitter of the transistor Q1 is grounded, and the resistor R12 and the light source LED are connected to the collector of Q1. Referring to FIGS. 1 and 2, the infrared receiving circuit 04 comprises a capacitor C10, a resistor R10, and an infrared signal receiver QP1. One end of the capacitor C10 is connected to a power output port and the other end thereof is connected to the infrared signal receiver QP1. Similarly, one end of the capacitor R10 is connected to the power output port and the other end thereof is connected to the infrared signal receiver QP1. The infrared signal receiver QP1 is connected to the single-chip microcomputer of the control circuit 05. The reflected infrared signal received by the infrared receiving circuit 04 is originated from the infrared signal emitted by the infrared transmitting circuit 02. The infrared receiving circuit 04 may be an infrared transmitter. The infrared transmitter is a remote control device with a remote control function, which transmits light rays outwardly in a certain range through an infrared transmitting tube, and is widely used in consumer electronics, industrial and communication infrared transceivers, data transfer technology and other fields.

Referring to FIGS. 1 and 2, the point control circuit 03 comprises resistors R3, R11, an indicator LED and a button SW1. Two ends of the point control circuit 03 are both connected to the single-chip microcomputer. The resistor R11 and the indicator LED are connected in series, and the resistor R3 and the button SW1 are connected in series. When the button SW1 is pressed down, the point control circuit 03 is turned on, and the single-chip microcomputer receives a trigger signal to generate a lamp strip point control sensing control signal to realize manual control.

Figure 5:
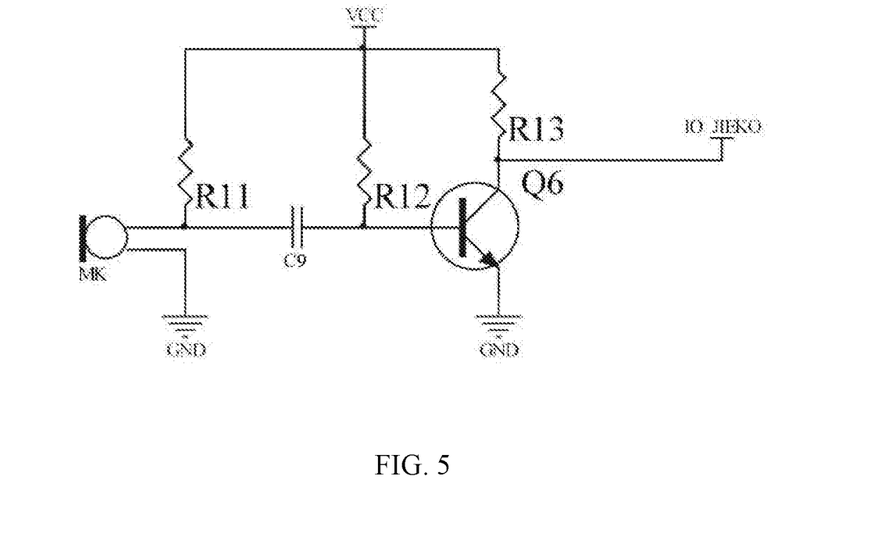
FIG. 5 is a schematic diagram of an audio receiving and amplifying circuit of a combined lamp strip controller according to an embodiment of the present invention.

Referring to FIG. 5, the audio receiving and amplifying circuit 08 comprises resistors R11, R12, R13, a capacitor C8, a transistor Q6, and a microphone MK. The microphone MK is configured to receive an audio signal and convert the audio signal into an electrical signal. One end of the microphone MK is grounded, and the other end thereof is connected to the capacitor C9. The capacitor C9 is connected to the base of the transistor Q6. One end of the resistor R11 is connected between the microphone MK and the capacitor C9, and the other end thereof is connected to a power port VCC. The base of the transistor Q6 is further connected to the resistor R12. One end of the resistor R12 is connected to the power port VCC. The collector of the transistor Q6 is connected to the resistor R13, and the collector of the transistor Q6 is connected to the single-chip microcomputer of the control circuit 05 via a port IO JIEKO. The emitter of the transistor Q6 is grounded. The audio receiving and amplifying circuit 08 collects an external audio signal through an audio amplifier, and the external audio signal is transferred to the single-chip microcomputer through the audio receiving and amplifying circuit 08, such that the single-chip microcomputer generates an audio sensing signal.

In a combined lamp strip controller provided by an embodiment of the present invention, preferably, the audio receiving and amplifying circuit 08 senses an intensity of the audio signal to generate the audio sensing signal of a different intensity; the control circuit 05 generates the audio sensing control signal of a different intensity according to the intensity of the audio sensing signal; and the drive circuit 06 controls the lighting frequency of the lamp strip according to the intensity of the audio sensing control signal.

Corresponding to the above-mentioned infrared-sensing lamp strip controller, an embodiment of the present invention further discloses a combined lamp strip control method. Preferably, the control method further comprises: sensing, by the audio receiving and amplifying circuit 08, an intensity of the audio signal to generate the audio sensing signal of a different intensity; generating, by the control circuit 05, the audio sensing control signal of a different intensity according to the intensity of the audio sensing signal; and controlling, by the drive circuit 06, the lighting frequency of the lamp strip according to the intensity of the audio sensing control signal.

In the embodiment of the present invention, in the audio sensing control approach, the intensity of the audio signal can also be sensed, and the intensity of the audio signal is used to control the lighting frequency of the lamp strip. Still further, it is possible to control the lighting frequency of the lamp strip by using a rhythm, such that the lighting frequency of the lamp strip changes with the rhythm.

Figure 6:
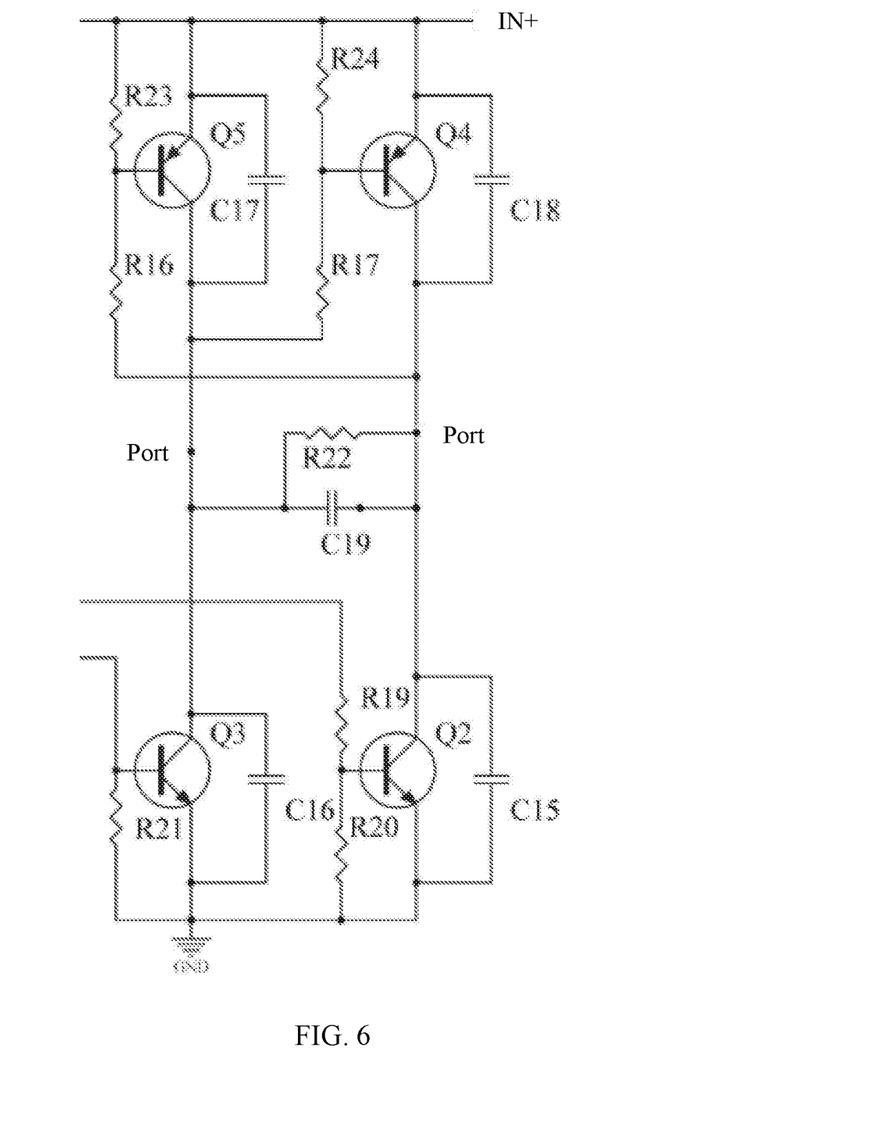
FIG. 6 is a schematic diagram of a drive circuit of a combined lamp strip controller according to an embodiment of the present invention.

Referring to FIG. 6, the drive circuit 06 is a bridge drive circuit, which controls LED lights on the lamp strip to change the lighting mode, and the lighting mode can be controlled by a program written into the single-chip microcomputer. The bridge drive circuit comprises transistors Q2, Q3, Q4, Q5, capacitors C15, C16, C17, C18, C19, and resistors R16, R17, R18, R19, R20, R21, R22, R23, R24. The base of the capacitor Q5 is connected to the collector of the transistor Q4 via the resistor R16, the base of the transistor Q4 is connected to the collector of the transistor Q5 via the resistor R17, and the capacitors C17 and C18 are respectively connected in parallel between the collector and the emitter of the transistors Q5 and Q4. The collector of the transistor Q3 is connected to the collector of the transistor Q5. The collector of the transistor Q2 is connected to the collector of the transistor Q4. Connection lines between the collector of the transistor Q3 and the collector of the transistor Q5, and between the collector of the transistor Q2 and the collector of the transistor Q4 are respectively provided with a lamp strip access port. The base of the transistor Q2 and the base of the transistor Q3 are respectively connected to pins of the single-chip microcomputer via the resistors R18 and R19. The emitter of the transistor Q2 is grounded, the emitter of the transistor Q3 is grounded via the resistor R21, and the resistor R20 is provided between the collector of the transistor Q3 and the collector of the transistor Q2. In the embodiment of the present invention, one positive and one negative two-line lamp strip are driven by the bridge drive circuit, one of the lamp strips is controlled by two of the transistors in diagonal positions, and driving currents of the two lamp strips are in opposite directions. Each of the sensing control signals received by the bridge drive circuit described above is a pulse signal. When a pulse signal is received by the bridge drive circuit at a certain time, the two transistors in the diagonal positions in the bridge drive circuit are turned on at the same time, and the other two transistors are turned off. For example, two of the transistors Q2 and Q5 are turned on, and the transistors Q3 and Q4 are turned off. The bridge drive circuit outputs the driving current in a first direction, the first lamp strip is lit, and the second lamp strip is not lit. At the next time, the bridge drive circuit receives the next pulse signal, the two transistors Q3 and Q4 are turned on, and the transistors Q2 and Q5 are turned off. The bridge drive circuit outputs the driving current in a second direction, the second lamp strip is lit, and the first lamp strip is not lit. The bridge drive circuit controls, based on this cycle, the two lamp strips to flash according to the pulse signals.

The control circuit 05 comprises the single-chip microcomputer, capacitors C11, C12, and a crystal oscillator XY1, C11, C12 are respectively connected at one end to the single-chip microcomputer, and grounded at the other end. The crystal oscillator XY1 is arranged between C11 and C12, and is controlled by the single-chip microcomputer to generate a pulse signal. The single-chip microcomputer contains one or more program instructions, the one or more program instructions are configured to execute and generate at least one mode of sensing control signals, and a sensing control signal of the next mode is generated according to a setting within a predetermined period when the control circuit receives the next sensing signal; the sensing signal includes the infrared sensing signal, the audio sensing signal, and the point control sensing signal; and the sensing control signal includes the infrared sensing control signal, the audio sensing control signal, and the point control sensing control signal.

In this way, the embodiments of the present invention can support three control approaches, namely infrared sensing control, audio sensing control and point control sensing control at the same time, which can greatly increase the control approaches of the lamp strip. Further, in the same control approach, multiple modes of sensing control can also be implemented by the program instructions in the single-chip microcomputer of the control circuit, making the control more flexible.

The embodiments of the present invention can support three control approaches, namely infrared control, sound control and manual control at the same time, which can greatly increase the control approaches of the lamp strip and make the control more flexible.

Although the present invention has been described in detail above with the general description and particular embodiments, on the basis of the present invention, some modifications or improvements can be made thereto, which would have been obvious to those skilled in the art. Therefore, these modifications or improvements made without departing from the spirit of the present invention all fall within the scope of protection of the present invention.

The invention claimed is:

1. A combined lamp strip controller, comprising:
 a power supply circuit, a control circuit, an infrared transmitting circuit, an infrared receiving circuit and a drive circuit, wherein,
 the drive circuit is a bridge drive circuit;
 the power supply circuit is configured to provide working power for each circuit in the combined lamp strip controller, and the infrared transmitting circuit, the infrared receiving circuit and the drive circuit are connected to the control circuit in an integrated manner;
 the infrared transmitting circuit is configured to continuously transmit an infrared signal to a lamp strip so as to form an infrared sensing area near the lamp strip;
 the infrared receiving circuit is configured to receive the infrared signal reflected by an outside person or object in the infrared sensing area and generate an infrared sensing signal;
 the control circuit is configured to receive the infrared sensing signal, and generate an infrared sensing control signal after being triggered by the infrared sensing signal; and
 the drive circuit is configured to drive the lamp strip to switch a lighting mode according to the infrared sensing control signal;
 an audio receiving and amplifying circuit connected to the control circuit in an integrated manner, wherein,
 the audio receiving and amplifying circuit is configured to form an audio sensing area near the lamp strip, receive an audio signal in the audio sensing area, and amplify a received audio signal to form an audio sensing signal;
 the control circuit is configured to receive the audio sensing signal, and generate an audio sensing control signal after being triggered by the audio sensing signal; and
 the drive circuit is configured to drive the lamp strip to switch the lighting mode according to the audio sensing control signal; and
 a point control circuit connected to the control circuit in an integrated manner, wherein
 the point control circuit is configured to receive a point control operation signal and convert the point control operation signal into a point control sensing signal;
 the control circuit is configured to receive the point control sensing signal, and generate a point control sensing control signal after being triggered by the point control sensing signal; and
 the drive circuit is configured to drive the lamp strip to switch the lighting mode according to the point control sensing control signal.

2. The combined lamp strip controller of claim 1, wherein the control circuit is provided with a single-chip microcomputer containing one or more program instructions, the one or more program instructions are configured to execute and generate at least one mode of sensing control signals, and a sensing control signal of a next mode is generated according to a setting within a predetermined period when the control circuit receives a next sensing signal; a sensing signal comprises the infrared sensing signal, the audio sensing signal, and the point control sensing signal; and the sensing control signal comprises the infrared sensing control signal, the audio sensing control signal, and the point control sensing control signal.

3. The combined lamp strip controller of claim 2, wherein the sensing signal processing circuit senses an intensity of the audio signal to generate the audio sensing signal of a different intensity; the control circuit generates the audio sensing control signal of a different intensity according to intensity of the audio sensing signal; and the drive circuit controls a lighting frequency of the lamp strip according to the intensity of the audio sensing control signal.

4. A combined lamp strip control method, comprising:
providing, by a power supply circuit, working power for each circuit in a combined lamp strip controller;
connecting, by a control circuit, an infrared transmitting circuit, an infrared receiving circuit and a drive circuit in an integrated manner;
continuously transmitting, by the infrared transmitting circuit, an infrared signal to a lamp strip so as to form an infrared sensing area near the lamp strip;
receiving, by the infrared receiving circuit, the infrared signal reflected by an outside person or object in the infrared sensing area;
generating an infrared sensing signal after a reflected infrared signal received by the infrared receiving circuit;
generating, by the control circuit, an infrared sensing control signal after being triggered by the infrared sensing signal; and
driving, by the drive circuit, the lamp strip to switch a lighting mode according to the infrared sensing control signal, the drive circuit being a bridge drive circuit;
forming, by an audio receiving and amplifying circuit connected to the control circuit in an integrated manner, an audio sensing area near the lamp strip, receiving an audio signal in the audio sensing area, and amplifying a received audio signal to form an audio sensing signal;
generating, by the control circuit, an audio sensing control signal after being triggered by the audio sensing signal; and
driving, by the drive circuit, the lamp strip to switch the lighting mode according to the audio sensing control signal; and
receiving, by a point control circuit connected to the control circuit in an integrated manner, a point control operation signal and converting the point control operation signal into a point control sensing signal;
generating, by the control circuit, a point control sensing control signal after being triggered by the point control sensing signal; and
driving, by the drive circuit, the lamp strip to switch the lighting mode according to the point control sensing control signal.

5. The combined lamp strip control method of claim 4, wherein the control circuit executes and generates at least one mode of sensing control signals by means of one or more program instructions contained in a single-chip microcomputer, and a sensing control signal of a next mode is generated according to a setting within a predetermined period when the control circuit receives a next sensing signal; a sensing signal comprises the infrared sensing signal, the audio sensing signal, and the point control sensing signal; and the sensing control signal comprises the infrared sensing control signal, the audio sensing control signal, and the point control sensing control signal.

6. The combined lamp strip control method of claim 5, further comprising:
sensing, by the sensing signal processing circuit, an intensity of the audio signal to generate the audio sensing signal of a different intensity;
generating, by the control circuit, the audio sensing control signal of a different intensity according to intensity of the audio sensing signal; and
controlling, by the drive circuit, a lighting frequency of the lamp strip according to the intensity of the audio sensing control signal.

* * * * *